Jan. 23, 1968  H. D. MUEHL  3,365,096
TANK CLOSURE ASSEMBLY
Filed Dec. 20, 1965
FIG. 1
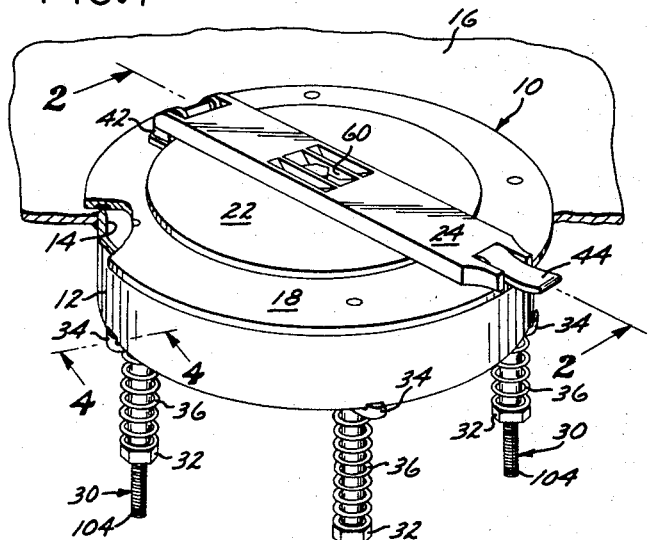
FIG. 4
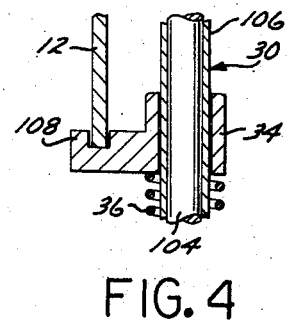
FIG. 2
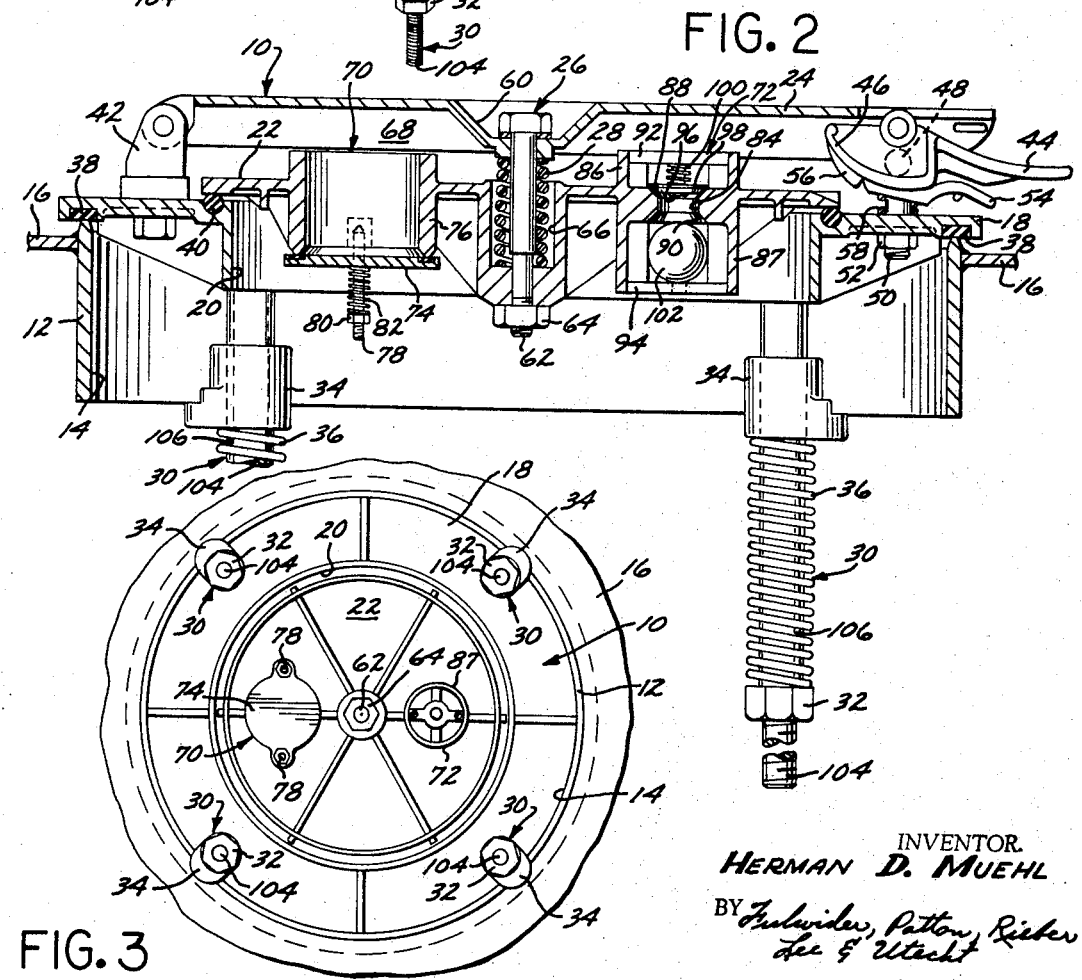
FIG. 3
INVENTOR.
HERMAN D. MUEHL
BY Fulwider, Patton, Rieber
Lee & Utecht
ATTORNEYS

United States Patent Office 3,365,096
Patented Jan. 23, 1968

3,365,096
TANK CLOSURE ASSEMBLY
Herman D. Muehl, Lynwood, Calif., assignor to C-B Equipment, Inc., Lynwood, Calif., a corporation of California
Filed Dec. 20, 1965, Ser. No. 515,030
10 Claims. (Cl. 220—57)

The present invention relates to a tank dome, and more particularly to a tank dome adapted to rapidly vent a tank upon development in the tank of pressures exceeding a predetermined value.

The term "tank dome" is generally used to identify that structure which covers the filling opening in the tank of a tank truck used for transporting gasoline or other inflammable liquids. The dome projects above the upper surface of the tank and is surrounded by a guard rail to protect the dome from damage in the event that the truck should become overturned in an accident. For various reasons it is desirable to keep the height of the projecting dome and rail as low as possible.

A conventional tank dome includes a base adapted for peripheral engagement upon the upper edge of a cylindrical ring which is welded to the edges of an opening provided in the tank. The ring defines the filling opening in the tank. The base also includes an opening through which inflammable liquids are introduced to fill the tank. This opening is normally closed by a cap which is pivotally mounted to the base.

State and Federal regulations require that a tank dome be capable of adequately venting a tank to protect it from the effects of both vacuum and excessive pressures. Consequently, the conventional tank dome includes both a vacuum relief valve and a pressure relief valve in the cap, each of the valves being biased to a closed position by a compression spring or the like. Upon development of a vacuum of predetermined magnitude in the tank, the vacuum relief valve automatically opens to vent air into the tank. Similarly, the pressure relief valve vents air from the tank to the outside whenever pressures develop in the tank above a predetermined value.

The vacuum and pressure relief valves are sufficient to handle moderate pressure drops and rises in the tank. For higher pressure rises, the conventional dome mounts the cap in such a way that the cap itself can be opened for venting. More particularly, the cap is mounted to a bridge element which is pivotally carried by the base. The cap mounting mechanism includes a bias element or spring which urges the cover into its seated or closed position but which permits the cap to rise against the bias of the spring to vent extraordinary pressures in the tank. This venting action normally occurs during a fire, explosion or other emergency condition. Unfortunately, the venting capacity of the cap is limited by the size of the aperture provided during upward movement of the cap, and the upward travel of the cap is in turn limited by the space available between the base and the bridge element upon which the cap is mounted. Consequently in order to increase the venting capacity of the cap to conform to government specifications, some manufacturers have raised the bridge element to provide more room for upward travel of the cap. However, the added height of the dome structure above the tank means that the height of the surrounding guard rail also has to be increased, which is undesirable for various reasons.

Accordingly, it is an object of the present invention to provide a tank dome adapted to vent the tank through the full area of the filling opening over which the tank dome is disposed.

Another object of the invention is the provision of a tank dome of the aforementioned character wherein the dome may be substituted for existing domes on tank trucks by merely cutting away the existing peripheral ring defining the filling opening and substituting a different ring better adapted to accommodate the present tank dome.

Yet another object of the invention is to provide a tank dome of the aforementioned character which is readily mountable upon or demountable from the ring defining the filling opening of the tank.

Another object of the invention is the provision of a tank dome of the aforementioned character wherein the base which pivotally mounts the cap for closing the filling opening is itself movable upwardly to vent the tank upon development in the tank of pressures exceeding a predetermined value, and is automatically reseatable to reseal the filling opening when the tank pressures are relieved.

Yet another object of the invention is to provide a tank dome of the aforementioned character which can be fabricated by making only a relatively few structural changes and additions to existing tank dome structures, thereby greatly increasing the venting capacity of the tank dome without increasing the distance which the dome projects above the top of the tank.

Other objects and features of the invention will become apparent from consideration of the following description taken in connection with the accompanying drawings, in which:

FIG. 1 is a perspective view of a tank dome according to the present invention, only a portion of the upper tank wall being shown for brevity;

FIG. 2 is an enlarged cross-sectional view taken along the line 2—2 of FIG. 1;

FIG. 3 is a bottom plan view of the tank dome; and

FIG. 4 is an enlarged detailed view taken along the line 4—4 of FIG. 1.

Referring now to the drawings, there is illustrated a tank dome 10 which is adapted for association with the usual cylindrical ring 12 defining the filling opening 14 of the tank, only a portion of which is shown at 16. The tank dome 10 is particularly adapted for use in conjunction with the tanks of tank trucks for carrying gasoline and other inflammable liquids. Recent changes in Government regulations concerning the transport of inflammable liquids in tank trucks have made it necessary to provide much greater venting capacity for emergency conditions such as fire and explosion. The manner in which improved venting is provided by the dome 10 will become apparent from the description which follows.

The tank dome 10 comprises, generally, a circular base 18 having a central opening 20; a cap 22 normally seated upon the base 18 and closing the central opening 20; a bridge bar 24 overlying the cap 22 in spaced relation and pivotally mounted to the base 18; connection means 26 mounting the cap 22 to the bridge bar 24 and including a compression cap spring 28 yieldable to permit the cap 22 to move away from the base 18 and toward the bridge bar 24 to vent the tank 16; a plurality of elongated anchor elements secured at their upper extremities to the base 18 and depending therefrom through the filling opening 14; a plurality of stop means or nuts 32 adjacent the lower extremities of the plurality of nuts 32; a plurality of lugs 34 axially slidably carried by the anchor elements 30; and a plurality of bias means or compression springs 36 interposed between the nuts 32 and the lugs 34 to bias the dome 10 against the ring 12.

More particularly, the base 18 peripherally engages the upper edge of the ring 12 in sealing relation therewith, and for this purpose includes an annular groove which receives a sealing gasket 38 for engagement with the ring 12. In addition, the base 18 includes an annular groove in its upper surface to receive a sealing or O-ring 40, against which the cap 22 rests in its closed position to seal off the interior of the tank 16.

The base 18 also includes a hinge mount 42 which is secured to the base and hingedly connected to one end of the elongated bridge bar 24. The opposite end of the bridge bar 24 mounts a latch 44 for pivotal movement about a horizontal axis. The latch 44 includes a depending inwardly projecting tongue portion 46 which is adapted to be received beneath the horizontal portion 48 of a latch mount 50 of inverted U-shape, the threaded extremities of the vertical legs of the latch mount 50 being secured to the base 18 by a pair of nuts 52.

The latch mount 50 carries a secondary or safety latch 54 which extends between the vertical legs of the latch mount 50 and includes a pair of spaced apart openings which slidably receive the vertical legs of the latch mount. Thus, the latch 54 is vertically moveable on the latch mount 50, and the openings therein are sufficiently large that the latch 50 can also be pivoted about a horizontal axis which is parallel to and spaced below the axis of pivotable movement of the main latch 44.

In the closed position of the latch 56, the inner extremity of the safety latch 54 engages a depending cam portion 56 provided at the inner extremity of the main latch 44. A bias means or compression spring 58 is interposed between the base 18 and the safety latch 54 so as to bias the safety latch 54 against the cam portion 56 and prevent the main latch 44 from being pivoted upwardly and outwardly without first pivoting the latch 54 downwardly to bring it out of engagement with the cam portion 56 of the main latch 44.

The bridge bar 24 includes a central depression 60 through which a headed bolt 62 is disposed, the bolt 62 forming a part of the connection means 26. The bolt 62 extends through suitable openings provided in the bridge bar 24 and in the cap 22 and includes a threaded lower end which mounts a nut 64 to secure the bolt 62 in position.

The cap spring 28 is disposed within a spring bore 66 provided in the cap 22, and has its opposite ends in engagement with the cap 22 and the bridge bar 24. With this arrangement, when the bridge bar 24 is securely latched to the base 18, the bias of the spring 28 urges the cap 22 into sealing relation with the O-ring 40 carried in the base 18. However, the cap 22 is able to move upwardly against the bias of the spring 28 to vent the tank 16 upon development of excessive pressures in the tank, the extent of upward movement of the cap 22 being limited by the clearance or space 68 defined by the confronting surfaces of the bridge bar 24 and the cap 22.

The cap 22 includes both a vacuum relief valve 70 and a pressure relief valve 72 to vent air into and out of the tank 16 during pressure fluctuations of relatively small magnitude.

The vacuum relief valve 70 includes a circular valve plate 74 normally in sealing engagement with the chamfered lower edge of a cylindrical flange 76 forming an integral part of the cap 22. The central opening defined by the flange 76 constitutes the space through which air is vented into the tank from the outside, the space normally being sealed off by the valve plate 74.

The valve plate 74 is slidably carried at its opposite edges by a pair of threaded studs 78 which are each threaded at their inner extremity to the flange 76. The outer end of each stud 78 mounts a nut 80, and a compression spring 82 is interposed between each nut 80 and the adjacent face of the valve plate 74 so as to normally bias the plate 74 to the closed position illustrated in FIG. 2. Upon the development in the tank 16 of a vacuum exceeding a predetermined value, the valve plate 74 is moved by atmospheric pressure against the bias of the springs 82 to vent air from atmosphere into the tank 16, as will be apparent.

The pressure relief valve 72 includes a passage 84 formed in the cap 22 and connecting the cylindrical spaces defined by an upwardly projecting cylindrical flange 86 and an oppositely or downwardly projecting cylindrical flange 87, both of which are integral with the cap 22. The passage 84 terminates in an upper seat 88 and a lower seat 90. The upper end of the flange 86 is straddled by a retaining strap 92 and the lower end of the cylindrical flange 87 is similarly straddled by a retaining strap 94.

The upper strap 92 includes a central opening for vertically slidably receiving a bolt 96 which carries a valve member 98 at its lower end and a compression spring 100 is interposed between the valve member 98 and the upper strap 92 to normally bias the valve member 98 to seated or closed position upon the seat 88, as illustrated. The area of the valve member 98 and the spring rate of the spring 100 is such that the valve member 98 will vent the tank 16 upon the development in the tank 16 of pressures of a predetermined magnitude. In one actual embodiment the valve member 98 vents a pressure of one pound per square inch gauge (p.s.i.g.), while the area of the cap 22 and spring rate of the spring 28 were such that the cap 22 vented at a pressure level of 3 p.s.i.g.

A spherical element or ball 102 is carried in the space between the lower strap 94 and the lower seat 90 and is adapted to seat against the lower seat 90 to seal off the tank 16 in the event that the tank truck should become overturned, thereby preventing the escape of inflammable liquids during an accident.

As previously adverted to, Government specifications require a particular venting capacity for the tank dome 10. In one actual instance the venting capacity must be 345,600 cubic feet of air per hour at 5 p.s.i.g. Assuming the diameter of the cap 22 to be 10 inches, with approximately one-half inch vertical travel possible before the cap 22 impinges against the bridge bar 24, it is possible to vent at a rate of only 108,000 cubic feet of air per hour at 5 p.s.i.g. Although the structure of the tank dome could be altered by raising the bridge bar 24, thereby providing for greater vertical travel of the cap 22 to increase the venting capacity, the present tank dome provides a unique means for augmenting the venting capacity by allowing the entire base 18 to rise upon the development of excessive pressures in the tank.

More particularly, the four equally circumferentially spaced anchor elements 30 are each characterized by an elongated, vertically disposed stud 104 which is threaded at its upper extremity into a suitable opening provided in the base 18. A tubular sleeve 106 is telescoped over each stud 104 with its upper end in engagement with the base 18 and its lower end in engagement with one of the nuts 32.

The lugs 34 are vertically slidable upon the sleeves 106, and the springs 36 are disposed between the nuts 32 and the lugs 34 to bias the lugs 34 upwardly, it being noted that the presence of the sleeves 106 dictates the extent to which the springs 36 are to be compressed by tightening of the nuts 32.

As best viewed in FIG. 4, each lug 34 includes a radially outwardly oriented lug or step portion 108 which engages the underside or lower edge of the ring 12 so that the upward bias of the springs 36 against the lugs 34 firmly holds the tank dome 10 in sealing relation with the ring 12 at the gasket 38. The lugs 34 are rotatable about the axes of the sleeves 106 so that the step portion 108 can clear the ring 12 for easy demounting of the tank dome 10 from the ring 12.

When pressures develop within the tank 16 which are more than can be vented by the pressure relief valve 72 and the cap 22, the base 18 rises against the bias of the springs 36 to provide the additional venting necessary. As will be apparent, as soon as the pressure level in the tank 16 falls to a desired level, the base 18 automatically reseats upon its gasket 38.

From the foregoing it will be apparent that a tank dome 10 has been provided which is adapted to greatly increase the venting capacity of existing tank dome designs by connecting the tank dome to the tank ring 12 in a manner which permits the entire base 18 to rise for venting over its whole periphery. The tank dome 10 is adapted for mounting to already installed rings 12 in existing tank truck installations, but preferably a new ring 12 of predetermined height is provided with each new tank dome installation to thereby insure a correct operative bias for the springs 36. By utilizing the sleeves 106, the bias of the equally circumferentially spaced springs 36 is balanced so that the base 18 tends to rise evenly during venting and tends to reseat evenly upon completion of venting.

Various modifications and changes may be made with regard to the foregoing detailed description without departing from the spirit of the invention or the scope of the following claims.

I claim:

1. In a tank dome for attachment to the peripheral ring defining the filling opening of a tank, wherein said tank dome includes a base for peripheral engagement upon the upper edge of said ring, a central opening in said base, a cap pivotally mounted to said base and normally latched shut to close said central opening, and a vent valve of predetermined venting capacity in said cap to vent said tank through said cap, the improvement comprising:
    a plurality of elongated anchor elements secured at their upper extremities to said base and depending therefrom through said filling opening;
    a plurality of stop means adjacent the lower extremities of said plurality of anchor elements;
    a plurality of lugs axially slidably carried by said plurality of anchor elements above said stop means and engaging the lower edge of said ring; and
    a plurality of bias means between said stop means and said lugs whereby said base is urged against the upper edge of said ring to seal said tank and yet is movable away from said ring against the bias of said bias means to vent said tank upon development in said tank of pressures substantially exceeding the venting capacity of said vent valve.

2. The improvement in a tank dome according to claim 1 wherein the lower extremities of said anchor elements are threaded and said stop means are nuts threaded onto said lower extremities.

3. The improvement in a tank dome according to claim 2 wherein a plurality of elongated spacer sleeves are carried by said anchor elements, are slidably disposed through said lugs, and have their opposite ends in engagement with said base and said nuts to thereby limit the extent to which said bias means can be compressed by threading of said nuts onto said lower extremities of said anchor elements.

4. The improvement in a tank dome according to claim 2 wherein each of said lugs includes a radially outwardly orientable lug portion for engagement with said lower edge of said ring, and wherein said lugs are pivotable about the axes of said anchor elements to move said lug portions out of engagement with said lower edge of said ring whereby said tank dome is readily demountable from said ring.

5. The improvement in a tank dome according to claim 1 wherein said plurality of bias means each takes the form of an elongated compression spring.

6. In a tank dome for attachment to the peripheral ring defining the filling opening of a tank, wherein said tank dome includes a base for peripheral engagement upon the upper edge of said ring, a central opening in said base, a cap normally seated upon said base and closing said central opening, a bridge bar overlying said cap in spaced relation, said bridge bar being pivotally mounted to said base and normally latched to said base in said overlying relation, and connection means mounting said cap to said bridge bar and including cap bias means yieldable to permit said cap to move away from said base and toward said bridge bar through the space therebetween to vent said tank, the improvement comprising:
    a plurality of elongated anchor elements secured at their upper extremities to said base and depending therefrom through said filling opening;
    a plurality of stop means adjacent the lower extremities of said plurality of anchor elements;
    a plurality of lugs axially slidably carried by said plurality of anchor elements above said stop means engaging the lower edge of said ring; and
    a plurality of bias means between said stop means and said lugs whereby said base is urged against the upper edge of said ring to seal said tank and yet is movable away from said ring against the bias of said bias means to vent said tank upon development in said tank of pressures substantially exceeding the venting capacity of said cap.

7. The improvement in a tank dome according to claim 6 wherein the lower extremities of said anchor elements are threaded and said stop means are nuts threaded onto said lower extremities.

8. The improvement in a tank dome according to claim 7 wherein a plurality of elongated spacer sleeves are carried by said anchor elements, are slidably disposed through said lugs, and have their opposite ends in engagement with said base and said nuts to thereby limit the extent to which said bias means can be compressed by threading of said nuts onto said lower extremities of said anchor elements.

9. The improvement in a tank dome according to claim 7 wherein each of said lugs includes a radially outwardly orientable lug portion for engagement with said lower edge of said ring, and wherein said lugs are pivotable about the axes of said anchor elements to move said lug portions out of engagement with said lower edge of said ring whereby said tank dome is readily demountable from said ring.

10. The improvement in a tank dome according to claim 6 wherein said plurality of bias means each takes the form of an elongated compression spring.

References Cited

UNITED STATES PATENTS 2,719,644  10/1955  Jurs _____ 220—25
2,776,070  1/1957  Phillips _____ 220—44

THERON E. CONDON, *Primary Examiner.*

G. T. HALL, *Examiner.*